(12) United States Patent
Alshafei et al.

(10) Patent No.: US 10,693,751 B2
(45) Date of Patent: Jun. 23, 2020

(54) END-TO-END IT SERVICE PERFORMANCE MONITORING

(71) Applicant: Saudi Arabian Oil Company, Dhahran (SA)

(72) Inventors: Hamed A. Alshafei, Khobar (SA); Baher Al Ramady, Dammam (SA); Hussain Al Nasser, Dhahran (SA); Nawaf I. Al Dossary, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 15/918,562

(22) Filed: Mar. 12, 2018

(65) Prior Publication Data

US 2019/0280950 A1 Sep. 12, 2019

(51) Int. Cl.
*G06F 15/173* (2006.01)
*H04L 12/26* (2006.01)
*H04L 12/24* (2006.01)
*G06F 11/34* (2006.01)
(Continued)

(52) U.S. Cl.
CPC ........ *H04L 43/062* (2013.01); *G06F 11/3006* (2013.01); *G06F 11/324* (2013.01); *G06F 11/3419* (2013.01); *G06F 11/3495* (2013.01); *H04L 41/0893* (2013.01); *H04L 41/12* (2013.01); *H04L 41/5009* (2013.01); *H04L 43/028* (2013.01); *H04L 43/045* (2013.01); *H04L 43/12* (2013.01); *H04L 43/16* (2013.01); *G06F 2201/81* (2013.01); *H04L 43/0817* (2013.01); *H04L 43/0852* (2013.01)

(58) Field of Classification Search
CPC ..... H04L 43/062; H04L 43/12; H04L 43/045; H04L 43/028; H04L 43/16; H04L 41/0893; H04L 41/12
See application file for complete search history.

(56) References Cited

U.S. PATENT DOCUMENTS 5,581,482 A 12/1996 Wiedenman et al.
5,991,708 A 11/1999 Levine et al.
7,290,048 B1 10/2007 Barnett et al.
(Continued)

OTHER PUBLICATIONS

Chaudet et al.; "Optimal Positioning of Active and Passive Monitoring Devices"; Oct. 24, 2005; Emerging Network Experiment and Technology, ACM, New York; 12 pages (furnished by Applicant in IDS dated Jul. 26, 2019).*
(Continued)

*Primary Examiner* — Richard G Keehn
(74) *Attorney, Agent, or Firm* — Fish & Richardson P.C.

(57) ABSTRACT

A layout is generated of an end-to-end IT service. The layout identifies components of the end-to-end IT service and includes a physical layout and a logical layout. The layout is divided into smaller blocks. Each smaller block represents a function or a set of functions. Interactions for aggregation points between two or more blocks are identified. Using probes placed at aggregation points in the end-to-end IT service, performance of each interaction is measured at each aggregation point. Placement of the probes is optimized based on the interactions. Output is provided that includes information indicating measured performance of the interactions, including prioritized information for measured performance of anomalies.

20 Claims, 11 Drawing Sheets

(51) Int. Cl.
　　　G06F 11/30　　　(2006.01)
　　　G06F 11/32　　　(2006.01)

(56) References Cited

U.S. PATENT DOCUMENTS

| | | | |
|---|---|---|---|
| 7,373,557 B1 | 5/2008 | Wise et al. | |
| 7,953,847 B2 * | 5/2011 | Grelewicz | H04L 43/16 709/224 |
| 8,204,958 B2 | 6/2012 | Oliynyk et al. | |
| 8,438,272 B2 | 5/2013 | Kieselbach | |
| 2011/0087522 A1 * | 4/2011 | Beaty | H04L 41/12 705/7.38 |
| 2014/0192677 A1 * | 7/2014 | Chew | H04L 69/14 370/254 |

OTHER PUBLICATIONS

International Search Report and Written Opinion issued in International Application No. PCT/US2019/021346 on Jul. 12, 2019, 19 pages.
Brattstrom et al., "Scalable Agentless Cloud Network Monitoring," 2017 IEEE 4th International Conference on Cyber Security and Cloud Computing, (CSCLOUD), IEEE, Jun. 26, 2017, 6 pages.
Chaudet et al., "Optimal positioning of active and passive monitoring devices," Emerging Network Experiment and Technology, ACM, New York, Oct. 24, 2005, 12 pages.
U.S. Appl. No. 10/354,230, filed Oct. 30, 2007, Barnett et al.

* cited by examiner

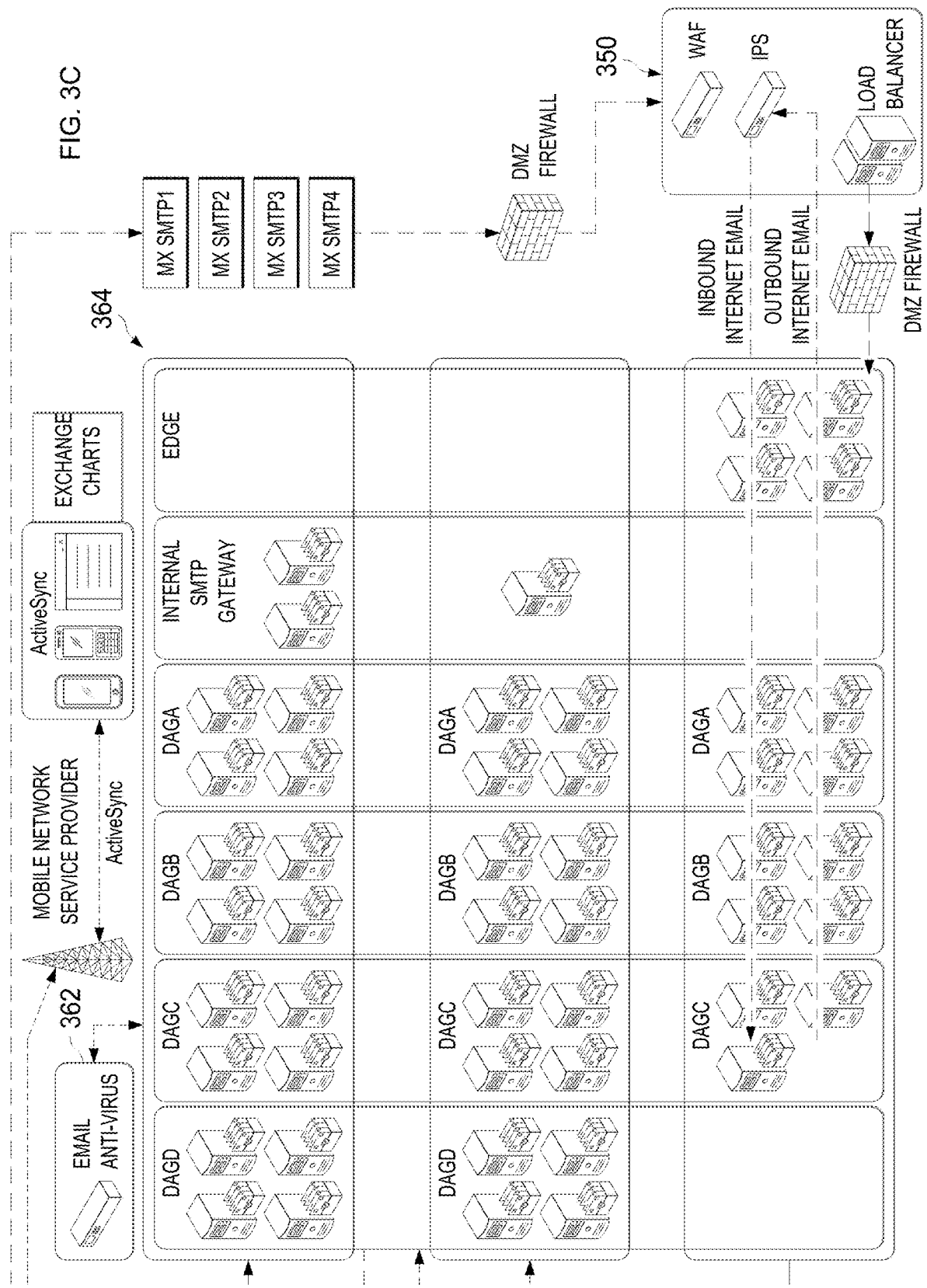

700

Generate a layout of an end-to-end information technology (IT) service, the layout identifying components of the end-to-end IT service and including a physical layout and a logical layout
702

Divide the layout into smaller blocks, each smaller block representing a function or a set of functions
704

Identify interactions for aggregation points between two or more blocks
706

Measure, using probes placed at aggregation points in the end-to-end IT service, performance of each interaction at each aggregation point, wherein placement of the probes is optimized based on the interactions
708

Provide output that includes information indicating measured performance of the interactions, including prioritized information for measured performance of anomalies
710

FIG. 7

END-TO-END IT SERVICE PERFORMANCE MONITORING

BACKGROUND

End-to-end information technology (IT) service solutions can span many interconnected technologies and components. When a service is degraded or interrupted, extensive effort and time may be needed to identify the root cause of the problem. Many IT experts may be involved in investigating and analyzing various logs and other sources of information to determine whether systems, databases, applications, networks, firewalls, and end user devices are performing normally. IT experts may use various independent tools that are used to monitor computing and communications systems. However, the tools are typically not integrated, making it difficult to pinpoint the root cause of a service degradation or interruption.

SUMMARY

The present disclosure describes techniques that can be used for end-to-end information technology (IT) service performance monitoring. In some implementations, a computer-implemented method includes: generating a layout of an end-to-end information technology (IT) service, the layout identifying components of the end-to-end IT service and including a physical layout and a logical layout; dividing the layout into smaller blocks, each smaller block representing a function or a set of functions; identifying interactions for aggregation points between two or more blocks; measuring, using probes placed at aggregation points in the end-to-end IT service, performance of each interaction at each aggregation point, wherein placement of the probes is optimized based on the interactions; and providing output that includes information indicating measured performance of the interactions, including prioritized information for measured performance of anomalies.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the performance of each interaction at each aggregation point in an end-to-end IT service can be monitored and measured automatically. Second, output can be provided that includes information indicating measured performance of the interactions at a low enough level to identify specific problems, including prioritized information identifying anomalies. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

FIGS. 3B and 3C are block diagrams collectively illustrating an example of a service providing email services in an email landscape, according to some implementations of the present disclosure.

FIG. 7 is a flowchart of an example method for monitoring end-to-end IT services, according to some implementations of the present disclosure.

Like reference numbers and designations in the various drawings indicate like elements.

DETAILED DESCRIPTION

Figure 1:
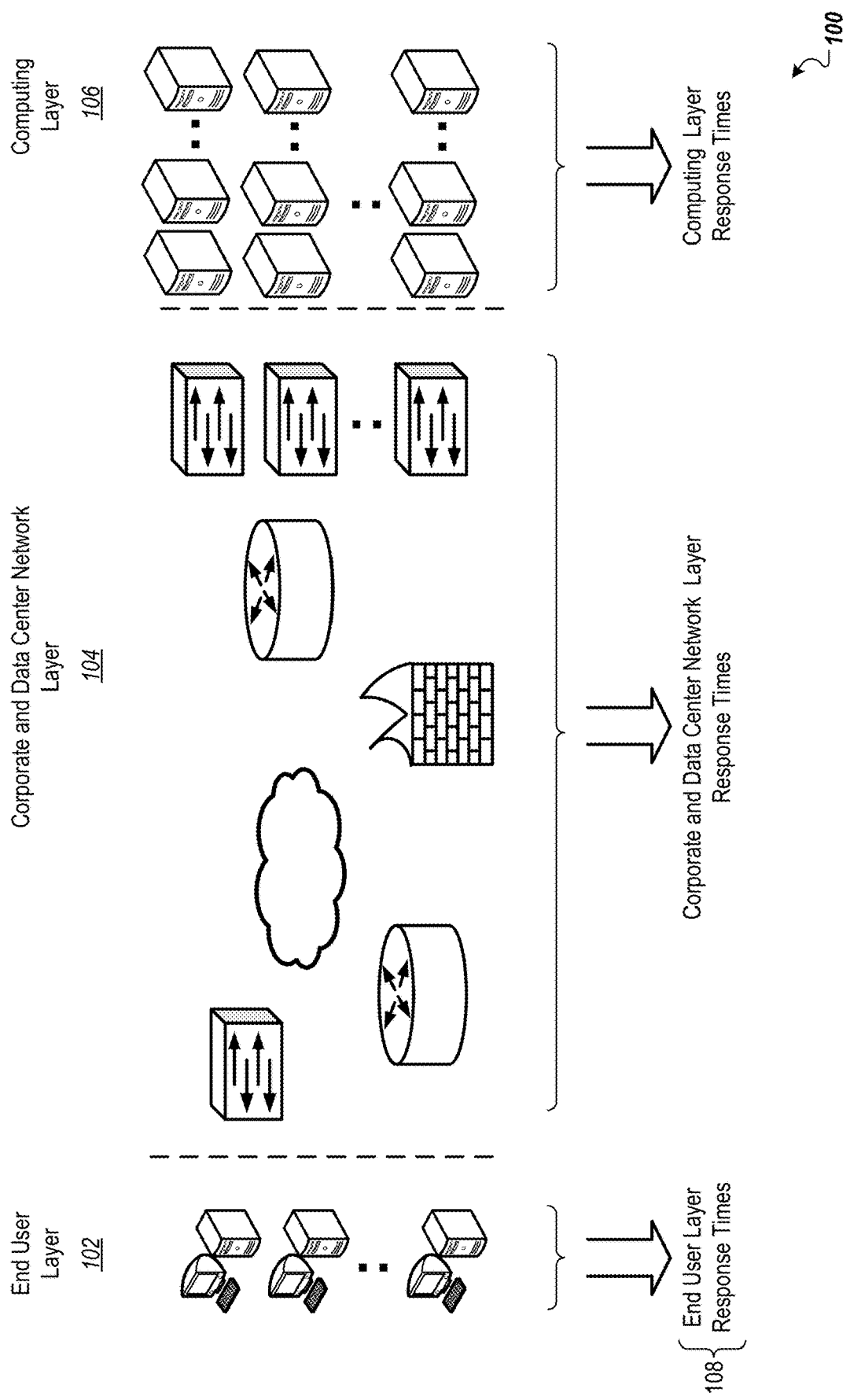
FIG. 1 is a block diagram illustrating an example of an end-to-end information technology (IT) service, according to some implementations of the present disclosure.

The following detailed description describes techniques for end-to-end information technology (IT) service performance monitoring. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques described in the present disclosure can be used to monitor end-to-end IT services and pinpoint parts of the infrastructure that are causing the problem, such as outages and performance issues. The techniques can be used to detect the problem before a particular service goes down, or to identify information needed to restore a service in a timely manner. Each IT service can be segregated logically to capture the availability and performance at various layers, including network layers, computing infrastructure layers, application layers, and end user layers. Collected performance metrics and availability data provided by different monitoring solutions can be analyzed and correlated to determine the performance and status of each component of the end-to-end IT services.

Techniques described in the present disclosure can also be used to highlight issues and bottlenecks prior to service interruption. The issues and bottlenecks can be identified using information obtained from probes placed at strategic locations of the IT infrastructure. The strategic locations can include, for example, aggregation points in the network in which groups of traffic can be identified. The aggregation points can include data center boundaries, Internet gateways, Internet protocol virtual private network (IPVPN) aggregations sites, and other boundaries between services. The probe can actively analyze performance and calculate response times of different domains (for example, end-user, network and server/applications) at various layers (for example, a transport layer). Transmission control protocol (TCP) and other protocols can be used by the probes to calculate the response time of these domains. Further, user datagram protocol (UDP) can be used to analyze other performance metrics in addition to response time.

In some implementations, to achieve end-to-end IT service monitoring, the following steps can be taken. First, the layout of an IT service can be built. The layout can include both physical and logical layouts along with the components included in each layout. Second, the layout can be divided into smaller blocks, where each block represents a single function or a set of functions. Third, every interaction between two or more blocks can be considered as an aggregation point at which a probe can be placed to measure interaction response times. Fourth, each interaction can be separated logically as needed into multiple sub-interactions, such as to filter the traffic of the interaction based on business groups. Once the probes are in place, a determination can be made that the service is degraded if one or more interaction response times exceed the threshold. Different thresholds can exist for different response times for different interactions. Further, each threshold can be fixed, or thresholds can be dynamic based on a baseline, for example, using historical data. This approach can assist in monitoring the performance of the end-to-end IT services and can help in narrowing down the problematic interaction/blocks where an analyst can focus on corresponding components. Increasing the number of blocks in which the layout is divided can improve the ability to identify a particular block that is causing a problem.

FIG. 1 is a block diagram illustrating an example of an end-to-end IT service 100, according to some implementations of the present disclosure. As depicted in FIG. 1, the end-to-end IT service 100 includes an end user layer 102, a corporate and data center network layer 104, and a computing layer 106. Other layers are possible, and each of the layers 102-106 can be sub-divided into multiple sub-layers.

The end-to-end IT service 100 can be a typical IT service in which an end-user launches (within the end user layer 102) an application that interacts with the network within the corporate and data center network layer 104. Traffic that is generated can pass through components of the corporate and data center network layer 104. The components can include, for example, switches, routers, firewalls, integrated project services (IPSes), service providers (including Internet service providers (ISPs)), and similar components. Traffic can also pass to the computing layer 106 that can include, for example, data centers, computing clouds, and such resources in which the computing infrastructure can process requests. Components of the computing layer 106 can also communicate with backend servers, including backend servers in the corporate and data center network layer 104. Responses that are generated in the computing layer 106 can be sent all the way to the end user, for example, to computing devices in the end user layer 102.

The end-to-end IT service 100 can be defined as a group of components, including devices and applications, that can span different domains including networking, computing, security, systems, end users, and service providers. The performance of a particular IT service can be estimated by the dividing the service into interconnected blocks that interact with each other. Each block can represent a set of components of the end-to-end IT service 100. Interactions between two or more blocks can be calculated separately. The interaction between any two blocks can also be logically separated and filtered to specific type of traffic, such as based on business groups. Response times 108 can be measured, including response times for interactions between components of the end-to-end IT service 100, including response times across the layers 102-106. The response times can be monitored automatically, such as to identify specific interactions in the end-to-end IT service 100 that may experience degraded performance or that serve as bottlenecks.

Figure 2:
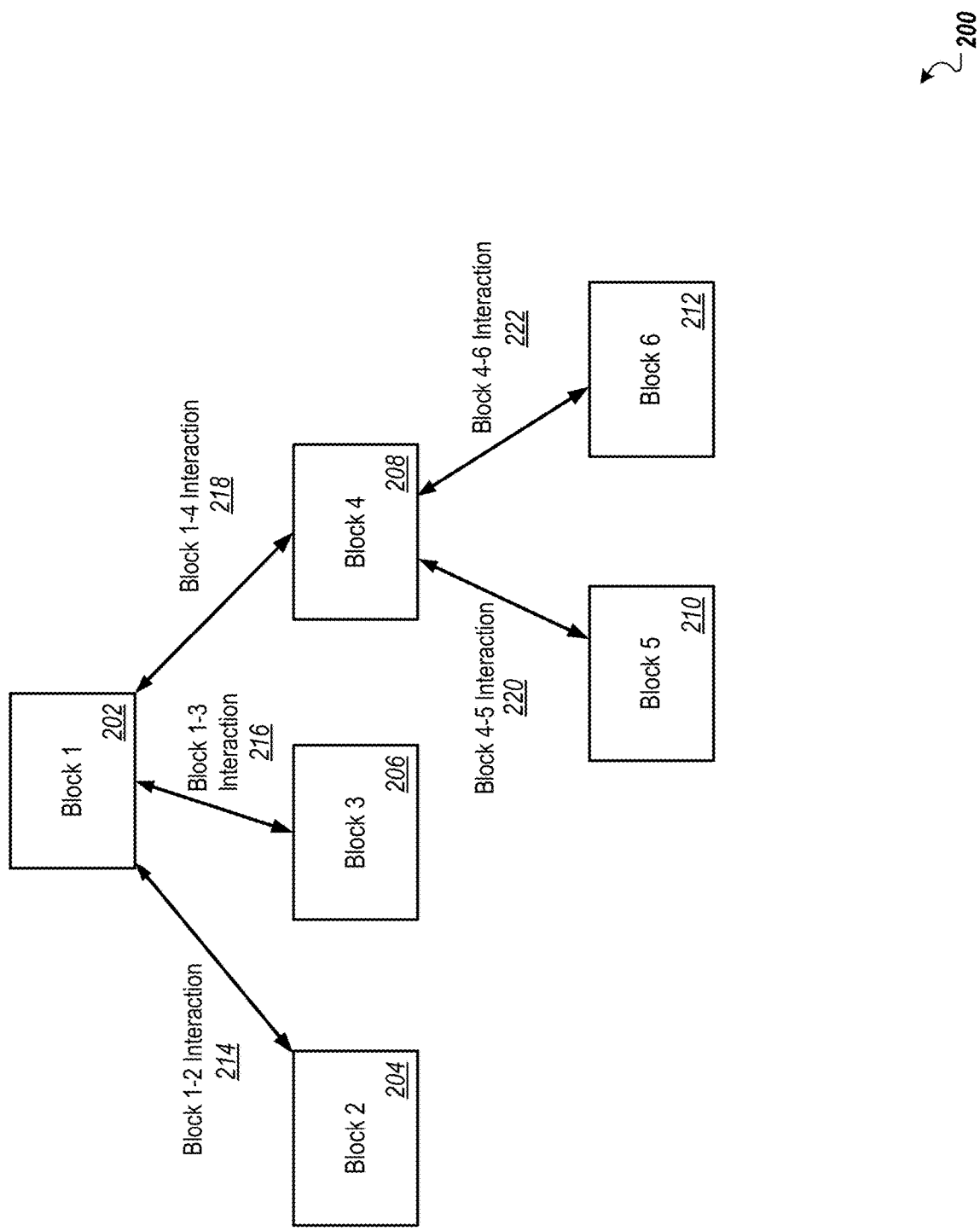
FIG. 2 is a block diagram illustrating an example of a block hierarchy of blocks and block-to-block interactions, according to some implementations of the present disclosure.

FIG. 2 is a block diagram illustrating an example of a block hierarchy 200 of blocks 202-212 and block-to-block interactions 214-222, according to some implementations of the present disclosure. Each of the blocks 202-212 can represent a different component, for example, of the end-to-end IT service 100.

Block 202, for example, can represent a component in the end user layer 102, such as one or more user devices. Blocks 204-206, for example, can represent different components in the corporate and data center network layer 104, such as a switch, a router, and a firewall, respectively. Block 1-2 interaction 214 represents an interaction between blocks 202 and 204. Block 1-3 interaction 216 represents an interaction between blocks 202 and 206. Block 1-4 interaction 218 represents an interaction between blocks 202 and 208. Monitoring the performance of the interactions 214-218 are just three examples of the interactions that can be monitored within the components of the end-to-end IT service 100. Interactions 220 and 222 can represent interactions between specific components of the corporate and data center network layer 104 and specific components of the computing layer 106.

Figure 3A:
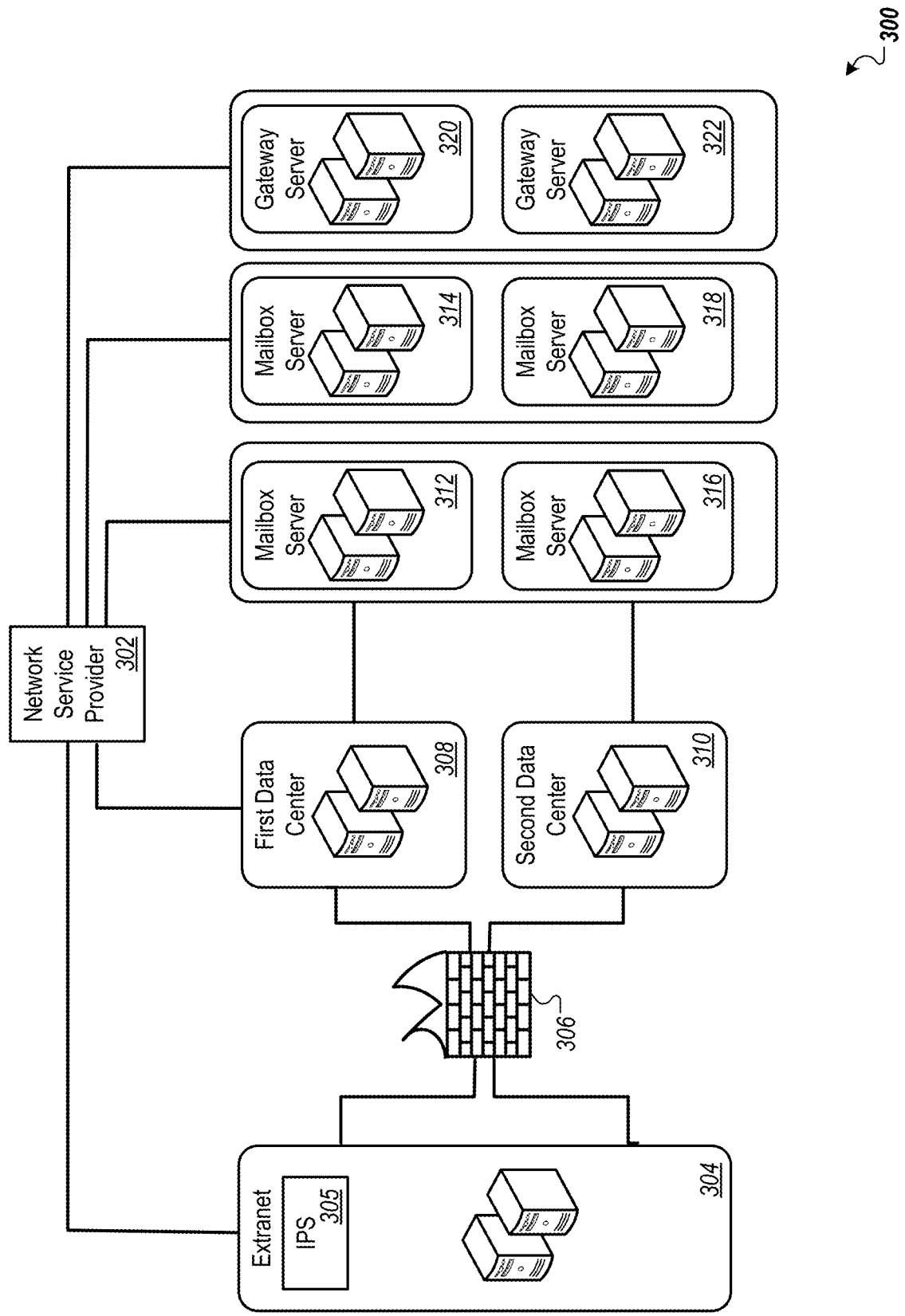
FIG. 3A is a block diagram illustrating an example of a service, according to some implementations of the present disclosure.

FIG. 3A is a block diagram illustrating an example of a service 300, according to some implementations of the present disclosure. The service 300 can be an end-to-end IT service that provides, for example, email services to the users. The service 300 can span different domains including network service provider 302, an extranet 304 (or demilitarized zone (DMZ) that includes an integrated project service (IPS) 305, a firewall 306, two data centers 308 and 310, mailbox servers 312-318, gateway servers 320-322, an Internet zone, an internet Service Provider (ISP), and a site for data recovery in different geographical location. Different functions can be provided including, inbound emails from the Internet, outbound emails to the Internet, mailbox servers to serve local users, system email gateways, and a disaster recovery site. Every function can have a specific path that connects components through which the traffic passes. Some parts of some paths can be shared between multiple functions. As such, FIG. 3A provides a layout that is generated of the end-to-end IT service, where the layout identifies components of the end-to-end IT service and including a physical layout and a logical layout.

Figure 3B:
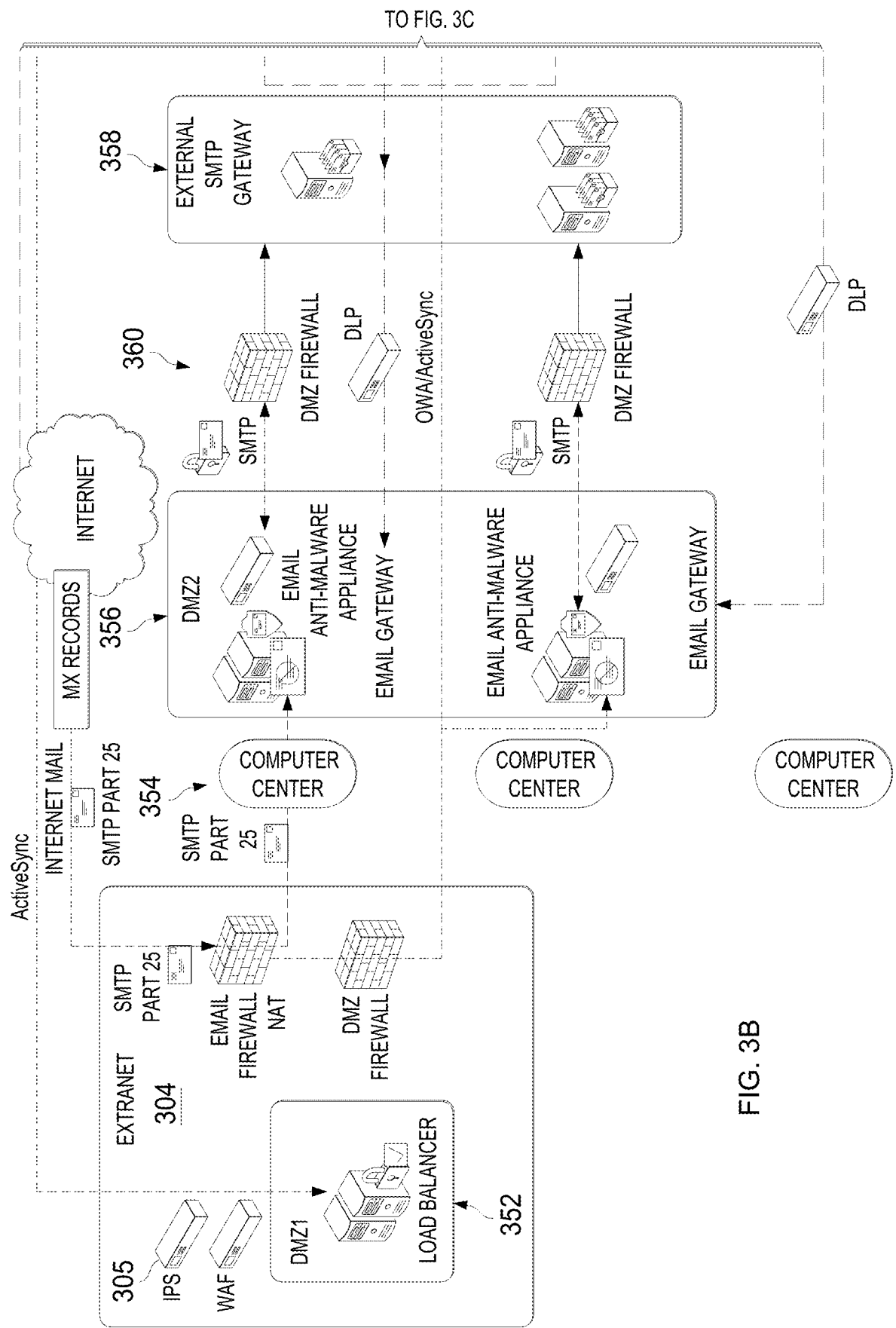

FIGS. 3B and 3C are block diagrams collectively illustrating an example of a service 350 providing email services in an email landscape, according to some implementations of the present disclosure. The service 350 depicted in FIGS. 3B and 3C illustrates components of an email exchange service from a physical point of view and is a more detailed example than the service 300 depicted in FIG. 3A. The service 350 includes the extranet 304 that includes the IPS 305 and components 352. The service 350 includes computer centers 354, each including an email gateway 356. Firewalls 360 exist between the email gateway 356 and external SMTP gateways 358 that serve as gateways to one or more email servers. The service 350 includes an email anti-virus component 362 that provide anti-virus functions to email servers 364. Arrows and lines in FIGS. 3B and 3C show paths of information that is sent between components of the service 350.

Figure 4A:
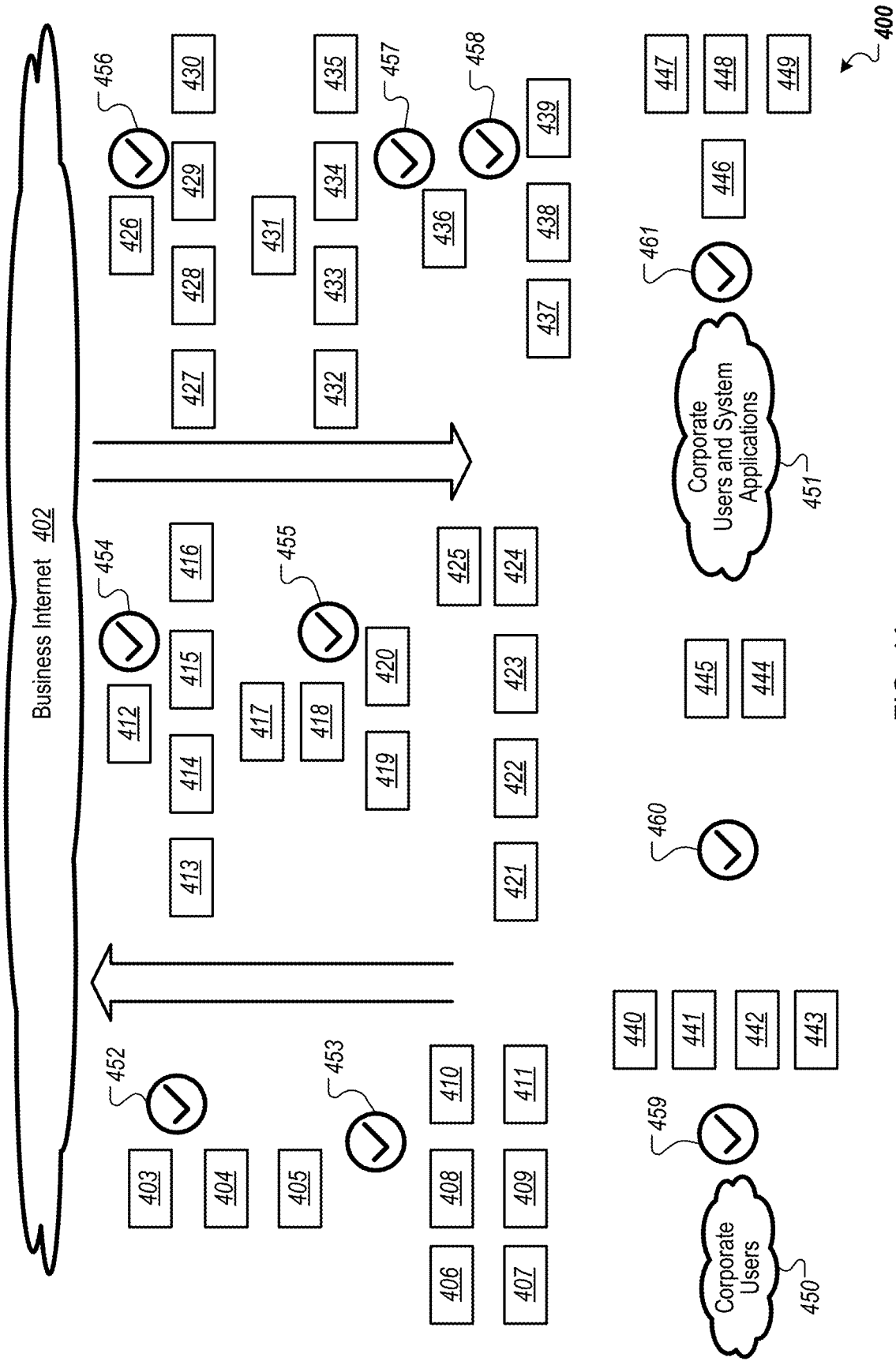
FIG. 4A is a block diagram illustrating an example blocks representing interactions in the service, according to some implementations of the present disclosure.

FIG. 4A is a block diagram illustrating example blocks representing interactions in the service 300, according to some implementations of the present disclosure. The breakdown of the service 300 into the blocks 402-451 can simplify monitoring the end-to-end performance of the service 300. Based on traffic flows that are known to exist, agentless probes 452-461 can be placed between specific blocks, in order to capture traffic flow using the probes. The probes can be actively monitored in order to capture, for example, response times of clients, networks and servers for each of the interconnections. The agentless probes 452-461 can be placed at identified interactions for aggregation points between two or more blocks, and performance of each interaction at each aggregation point can be measured. The information that is captured can be summarized based on each of the functional blocks in order to generate a real-time status of the blocks. The number of and placement of the probes can be optimized to assist in the fast identification of a performance issue of an interaction that occurs between the blocks. Agentless probe 453, for example, can measure user mail response times between the first data center 308 and the mailbox servers 312 and 314.

In some implementations, the blocks 402-451 can be further sub-divided, such as to decompose an interaction into sub-interactions for which the traffic is filtered based on business groups. For example, a block-to-block interaction can be sub-divided based on business groups that include, for example, human resources, logistics, marketing, accounting, accounts payable, and accounts receivable. The agentless probes 452-461 can be positioned or adjusted in order to capture performance information based on the business groups.

In some implementations, deciding which blocks 402-451 represent the service 300 can include analysis performed by analysts who are knowledgeable of the components of the service 300. In some implementations, deciding which blocks 402-451 represent the service 300 can further be based on existing interfaces between the components, including networks, application programming interfaces (APIs), remote function calls (RPCs), universal resource locators (URLs) of resources that are accessed, and other sources of information. In some implementations, inserted code or other logic can be used to implement some or all of the agentless probes 452-461.

Figure 4B:
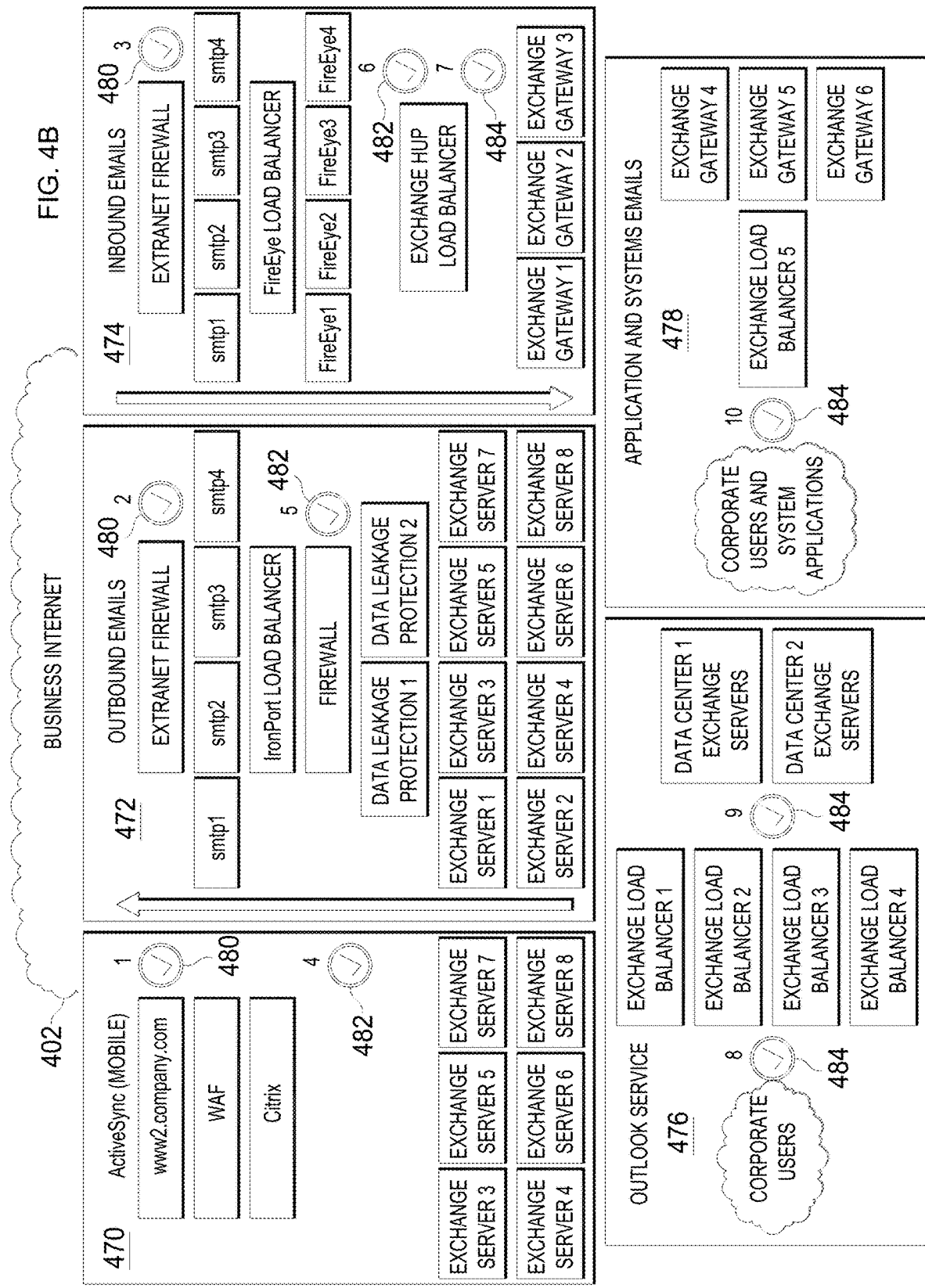
FIG. 4B is a block diagram illustrating example blocks representing interactions in the service, according to some implementations of the present disclosure.

FIG. 4B is a block diagram illustrating example blocks representing interactions in the service 350, according to some implementations of the present disclosure. The blocks in FIG. 4B depict a logical layout of components 470-478 of the email exchange service diagram shown in FIGS. 3B and 3C. Check marks 480-484 represent logical traffic and interactions that need to be monitored in order to measure the performance of the service. Some logical traffic and interactions can pass through the same physical links. Optimization of the number of probes can occur by identifying and tapping the needed physical links at which probes are placed.

Check marks 480 (for example, corresponding to interactions 1, 2 and 3) can represent the same physical link, and a probe can be placed at each check mark. A different physical link corresponds to the check marks 482 (for example, corresponding to interactions 4, 5 and 6), where three other probes can be placed. Yet another physical link corresponds to the check marks 484 (for example, corresponding to interactions 7, 8, 9 and 10), where four other probes can be placed.

Figure 5:
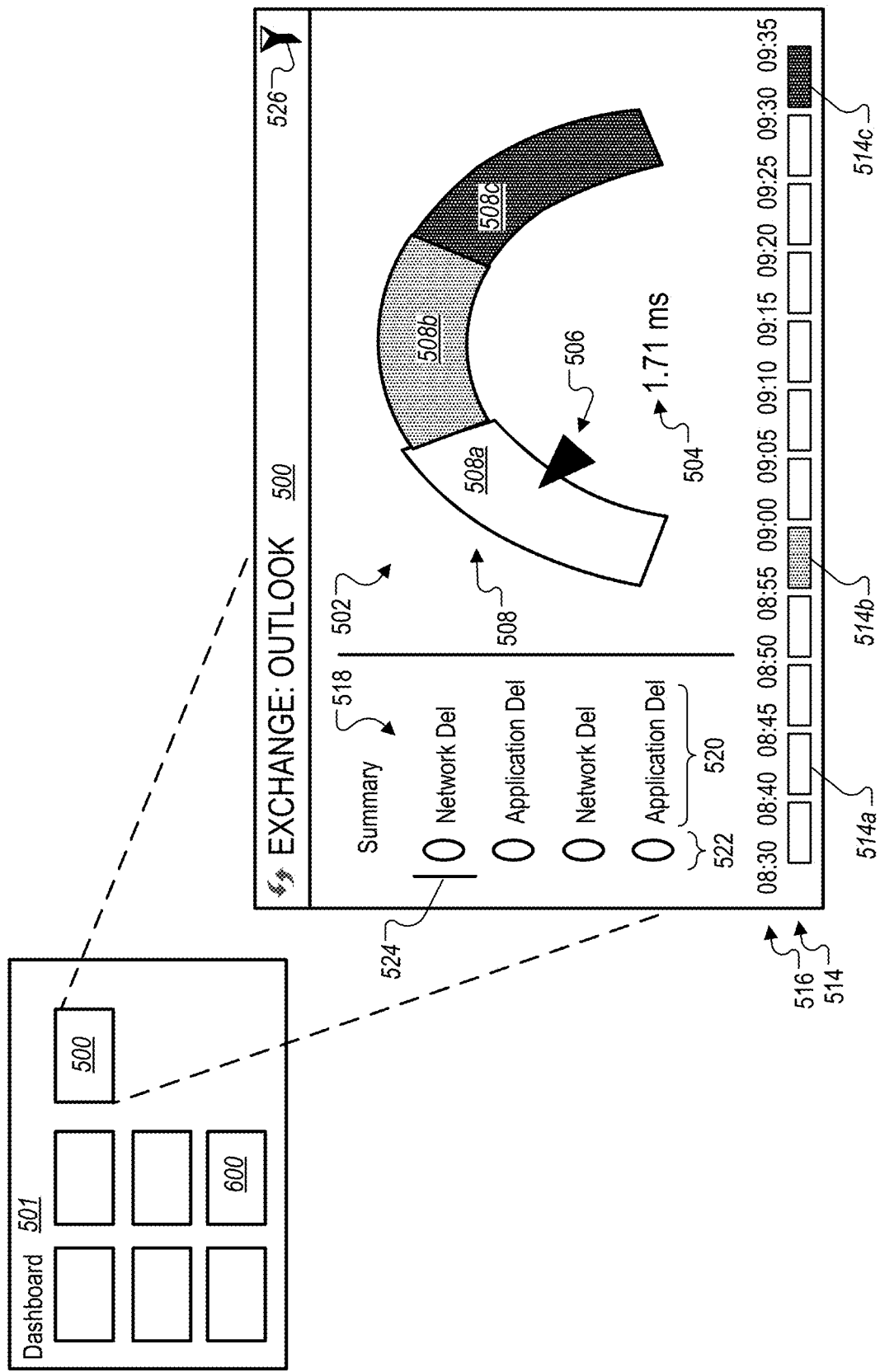
FIG. 5 is a screen representation illustrating an example of a dial-oriented dashboard element, according to some implementations of the present disclosure.

FIG. 5 is a screen representation illustrating an example of a dial-oriented dashboard element 500, according to some implementations of the present disclosure. The dial-oriented dashboard element 500 is part of a dashboard 501 and presents, for example, email response times for an email exchange. Other dial-oriented dashboard elements included in the dashboard 501 can present information for other functions, such as information captured by other probes of the agentless probes 452-461. The dashboard 501 provides output that includes information indicating measured performance of the interactions identified with reference to FIG. 4A, including prioritized information for measured performance of anomalies. The dial-oriented dashboard element 500 can be based on performance information obtained by the agentless probe 453, for example, that measures user mail response times between the first data center 308 and the mailbox servers 312 and 314.

A dial display 502 in the dial-oriented dashboard element 500 provides, for example, real-time response time information for an email server. The dial display 502 includes a digital read-out 504 that can display a current (or most recent) response time (for example, a 1.71 millisecond (ms) response time). The value of the digital read-out 504 can be synchronized with the position of a needle 506 to visually indicate a relative position on a dial 508 that corresponds to a broad range of possible values for response times. A position of the needle 506 can represent a current measured value of a measured performance metric, and metrics can be based on a baseline that relies on historical data. The dial 508 can include, for example, three (or some other number of) dial regions 508a, 508b, and 508c that correspond, for example, to low, medium, and high response time ranges, respectively. The dial-oriented dashboard element 500 (or the overall dashboard) can be refreshed upon selection of a time or performance metric or by using a refresh control.

Although depicted in FIG. 5 using white fill and various shading, dial regions included in the dashboard 501 can be color-coded or otherwise visually annotated to indicate or categorize different degrees or ranges of values for response times. For example, blue, green or some other cool color can be used for the dial region 508a to indicate lower (and acceptable) values for response times. Yellow, amber, or some other cautionary color can be used for the dial region 508b, such as to indicate response times that are approaching levels of concern. Red or some other alert color can be used for the dial region 508c, such as to indicate a range of response times that may present a problem with one or more components of the service 300. In some implementations, audible warnings can be used in addition to visual presentations of response times or other information presented in the dashboard 501.

Historical response time information can be provided in the dial-oriented dashboard element 500, such as in the form of response time range indicators 514 that span time increments between times 516. The response time range indicators 514 can be visually coded to match the visual coding on the three dial regions 508a, 508b, and 508c. For example, a response time range indicator 514a that spans the time period 8:40 to 8:45 can be white-filled to match shading in the dial region 508a, indicating that the response times during that time period remained in a target range. A response time range indicator 514b that spans the time period 8:55 to 9:00 can be light-shaded to match shading in the dial region 508b, indicating that the response times during that time period reached as high as the range indicated by the dial region 508b. A response time range indicator 514c that spans the time period 9:30 to 9:35 can be dark-shaded to match shading in the dial region 508c, indicating that the response times during that time period reached as high as the range indicated by the dial region 508c.

A summary region 518 allows a user viewing the dial-oriented dashboard element 500 to select one of the options 520, such as by using a control 522 corresponding to a desired option 520. An indicator 524 can indicate which ones of the options 520 is currently selected.

In some implementations, when a current value of the response time falls in the range of values applicable to the dial region 508a, dial regions 508b and 508c can be grayed out (and de-colorized) to visually hide alert-indicating colors such as yellow/amber and red. In some implementations, a display size can be increased for a particular one of the dial regions 508a-508c that applies to the current response time and in which the needle 506 is pointing.

In some implementations, controls can be added to the dial-oriented display 500 by which the user displaying the dashboard 501 can contact IT personnel responsible for components of the service that apply to a sustained, high response time. For example, user selection of the control can cause the automatic generation of an email, page, or phone call to pertinent IT experts who can trouble-shoot the problem. Each component of the dashboard 501, including the dial-oriented display 500, can have defined on-call IT professional information. Options can also exist to notify users of resources when the resources are unavailable or have slow response times.

In addition to response times presented in the dial-oriented dashboard element 500, other dashboard elements of the dashboard 501 can include, for example, response times for application mail gateways, active synchronizations, inbound emails, and outbound emails. For example, in the dashboard 501 of which the dial-oriented display 500 is part, every functional block/interaction for which information is captured by the agentless probes 452-461 can be monitored separately. In the case of performance degradation, an analyst viewing the dashboard 501 can focus only on the block having the issue. In some implementations, a drill-down feature can be provided on the dial-oriented display 500 to provide more information, for example, allowing the analyst to isolate a slow component.

In some implementations, a filter control 526 can be used to filter information presented in one or more of the dashboard elements. For example, selection of the filter control 526 can allow the user to specify on or more business groups for which information in the dashboard elements is to be presented. Application of the filter control 526 can logically filter traffic for the dial-oriented display 500.

In some implementations, other types of displays are possible in addition to the dial-oriented display 500. For example, any feasible or available tool can be used to represent data that is captured or generated. The data can include data captured from traffic from all domains and data used to calculate the performance of an overall service.

Figure 6:
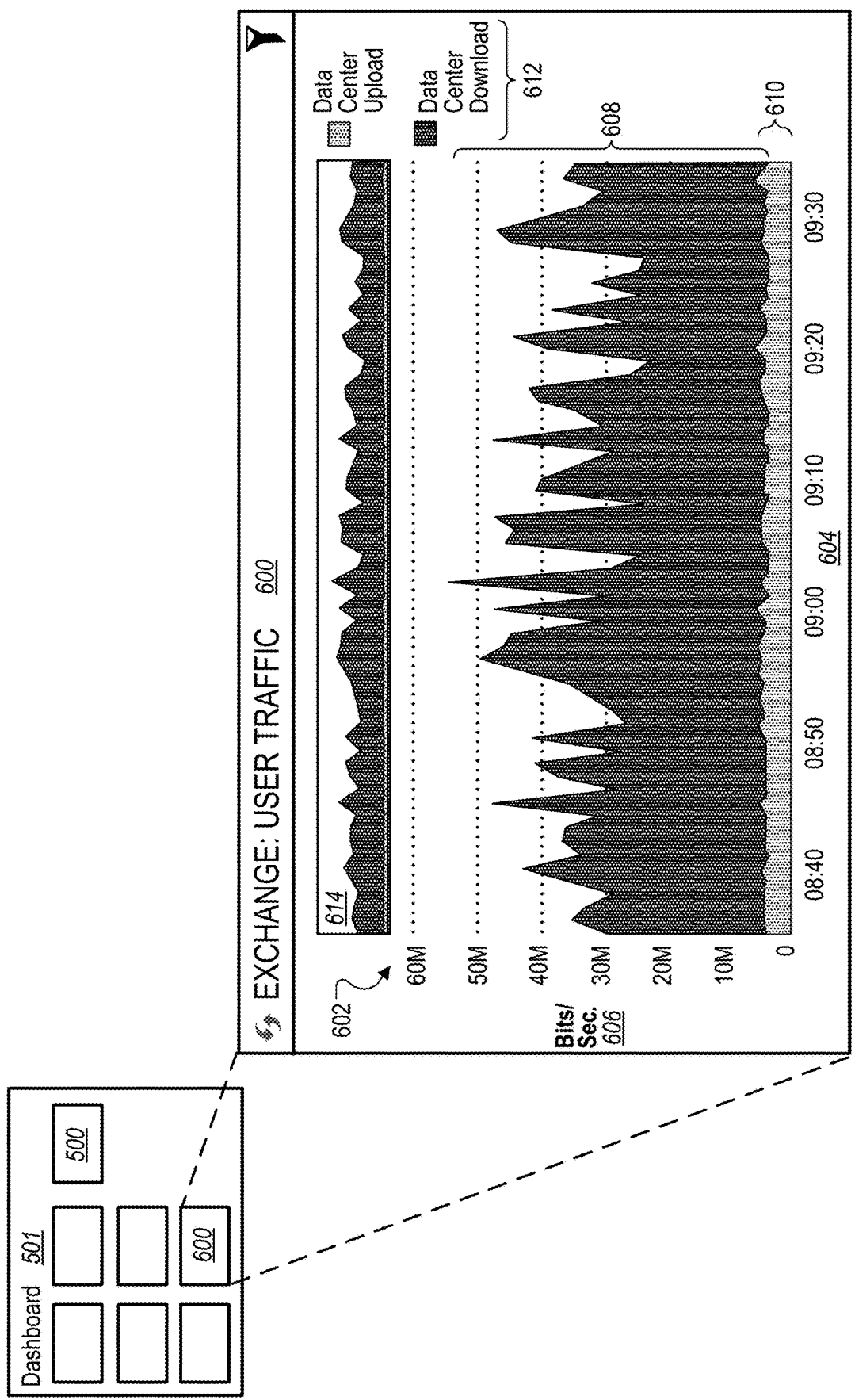
FIG. 6 is a screen representation illustrating an example of a graph-oriented dashboard element, according to some implementations of the present disclosure.

FIG. 6 is a screen representation illustrating an example of a graph-oriented dashboard element 600, according to some implementations of the present disclosure. The dial-oriented dashboard element 600 can be another element of the dashboard 501 and can present, for example, user traffic.

A graph 602 in the graph-oriented dashboard element 600 visually presents user traffic over time. A horizontal axis 604 represents time, including a range of time consistent with the times presented in the dial-oriented dashboard element 500. A vertical axis 606 represents bits per second of the user traffic.

In some implementations, all dashboard elements in the dashboard 501 can be synchronized with respect to time, meaning that the information presented in each of the dashboard elements covers the same time period. In some implementations, controls can be provided in the dashboard 501 by which the analyst can change the time period for which information is to be presented.

The graph 602 includes multiple elements, for example, a data center download element 608 and a data center upload element 610. Elements of the graph 602 are shaded according to a legend 612 that indicates which portions of the graph 602 apply to download versus upload traffic. A flattened or smoothed graph 614 presents a different view of the user traffic over the same time period as the graph 602.

In addition to response times presented in the graph-oriented dashboard element 600, other dashboard elements of the dashboard 501 can include, for example, separate elements for inbound traffic and outbound traffic. For example, other functional block/interaction for which user traffic information is captured by the agentless probes 452-461 can be monitored separately.

FIG. 7 is a flowchart of an example method 700 for monitoring end-to-end IT services, according to some implementations of the present disclosure. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order.

At 702, a layout is generated of an end-to-end information technology (IT) service, the layout identifying components of the end-to-end IT service and including a physical layout and a logical layout. As an example, a layout of components of the service 300 can be performed, as shown in FIG. 3A. From 702, method 700 proceeds to 704.

At 704, the layout is divided into smaller blocks, each smaller block representing a function or a set of functions. For example, the layout for the service 300 can be divided into smaller blocks, as described with reference to FIG. 4A. From 704, method 700 proceeds to 706.

At 706, interactions for aggregation points between two or more blocks are identified. For example, the agentless probes 452-461 can be placed between specific blocks in order to capture traffic flow using the probes, as described with reference to FIG. 4A. From 706, method 700 proceeds to 708.

At 708, performance of each interaction at each aggregation point is measured using probes placed at aggregation points in the end-to-end IT service. Placement of the probes is optimized based on the interactions. As an example, the agentless probes 452-461 can capture traffic flow between the blocks, as described with reference to FIG. 4A. The number of probes can be optimized based on the interactions. Some interactions can represent the same part of the network. Some data traffic can pass through two or more interactions. The number of probes can be minimized by eliminating probes that would otherwise be used for duplicate or impertinent traffic. From 708, method 700 proceeds to 710.

At 710, output is provided that includes information indicating measured performance of the interactions, including prioritized information for measured performance of anomalies. For example, the dashboard 501 can be presented to the user, as described with reference to FIGS. 5 and 6. After 710, method 700 stops.

In some implementations, method 700 can further include determining that a service is degraded if one or more interaction response times exceed a threshold. For example, if the needle 506 reaches the dial region 508c, this can be an indication that email response times for the email exchange are degraded.

Figure 8:
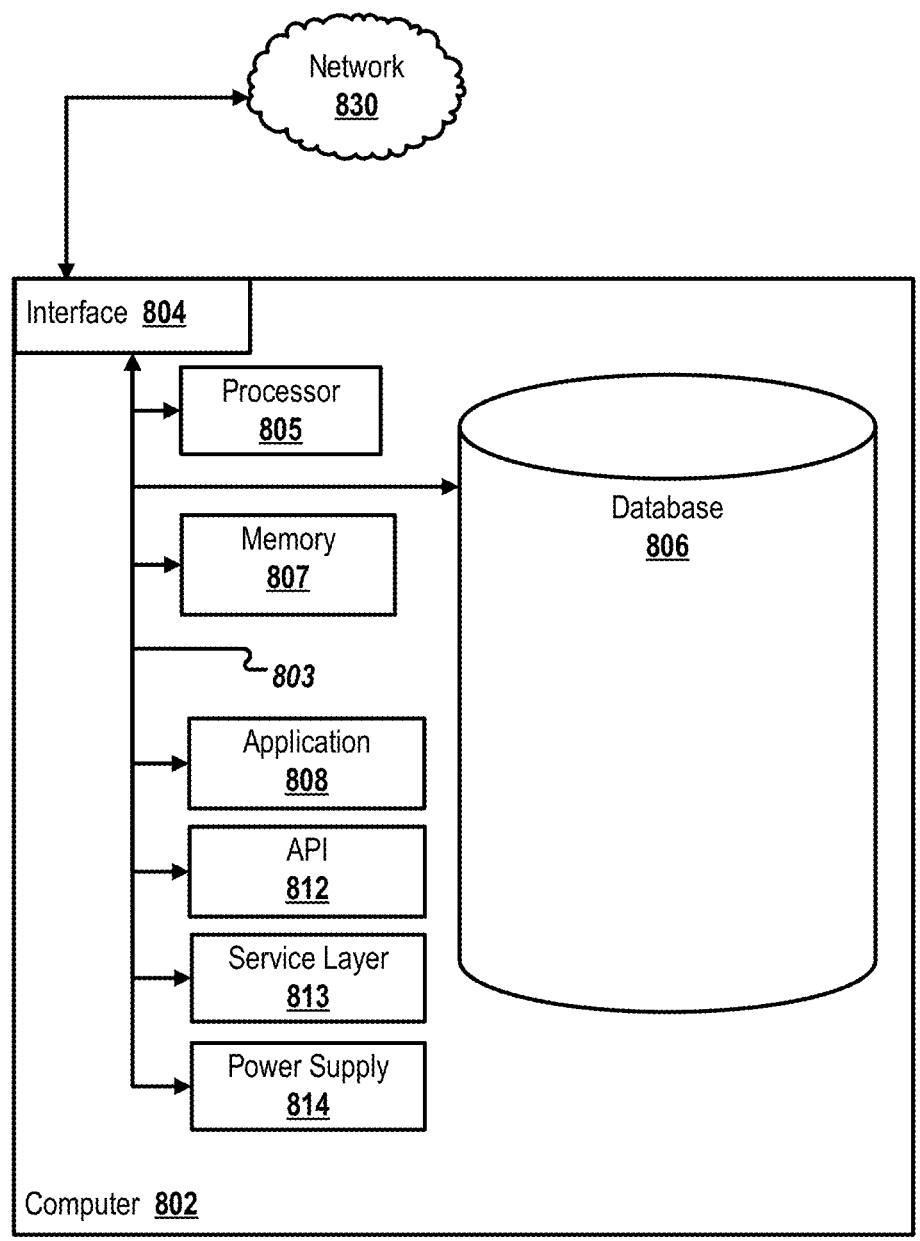
FIG. 8 is a block diagram illustrating an example computer system used to provide computational functionalities associated with described algorithms, methods, functions, processes, flows, and procedures as described in the instant disclosure, according to some implementations of the present disclosure.

FIG. 8 is a block diagram of an example computer system 800 used to provide computational functionalities associated with described algorithms, methods, functions, processes, flows, and procedures, as described in the instant disclosure, according to some implementations of the present disclosure. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a graphical-type user interface (UI) (or GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, or other server (or a combination of servers).

The computer 802 can receive requests over network 830 from a client application (for example, executing on another computer 802) and respond to the received requests by processing the received requests using an appropriate software application(s). In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other similar suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 comprises logic encoded in software or hardware (or a combination of software and hardware) and is operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). Memory 807 can store any data consistent with this disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power-supply 814 can include a power plug to allow the computer 802 to be plugged into a wall socket or other power source to, for example, power the computer 802 or recharge a rechargeable battery.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

Described implementations of the subject matter can include one or more features, alone or in combination.

For example, in a first implementation, a computer-implemented method, comprising: generating a layout of an end-to-end IT service, the layout identifying components of the end-to-end IT service and including a physical layout and a logical layout; dividing the layout into smaller blocks, each smaller block representing a function or a set of functions; identifying interactions for aggregation points between two or more blocks; measuring, using probes placed at aggregation points in the end-to-end IT service, performance of each interaction at each aggregation point, wherein placement of the probes is optimized based on the interactions; and providing output that includes information indicating measured performance of the interactions, including prioritized information for measured performance of anomalies.

The foregoing and other described implementations can each, optionally, include one or more of the following features:

A first feature, combinable with any of the following features, wherein the measured performance includes a response time.

A second feature, combinable with any of the previous or following features, wherein measuring performance of each interaction includes using a probe placed at the aggregation point of the interaction, the probe configured to collect performance information.

A third feature, combinable with any of the previous or following features, the method further comprising decomposing an interaction into sub-interactions for which the traffic is filtered based on business groups.

A fourth feature, combinable with any of the previous or following features, wherein providing output includes providing a dashboard that provides, for each interaction, a visual representation of performance of the interaction, wherein the visual representation includes a current performance and a history of past performance.

A fifth feature, combinable with any of the previous or following features, the method further comprising determining that a service is degraded if one or more interaction response times exceed a threshold.

A sixth feature, combinable with any of the previous or following features, wherein the threshold is fixed or the threshold is dynamic based on a baseline using historical performance data.

A seventh feature, combinable with any of the previous or following features, the method further comprising updating operating parameters of a device in the end-to-end IT service based on the information indicating measured performance of the interactions.

In a second implementation, a non-transitory, computer-readable medium storing one or more instructions executable by a computer system to perform operations comprising: generating a layout of an end-to-end IT service, the layout identifying components of the end-to-end IT service and including a physical layout and a logical layout; dividing the layout into smaller blocks, each smaller block representing a function or a set of functions; identifying interactions for aggregation points between two or more blocks; measuring, using probes placed at aggregation points in the end-to-end IT service, performance of each interaction at each aggregation point, wherein placement of the probes is optimized based on the interactions; and providing output that includes information indicating measured performance of the interactions, including prioritized information for measured performance of anomalies.

The foregoing and other described implementations can each, optionally, include one or more of the following features:

A first feature, combinable with any of the following features, wherein the measured performance includes a response time.

A second feature, combinable with any of the previous or following features, wherein measuring performance of each interaction includes using a probe placed at the aggregation point of the interaction, the probe configured to collect performance information.

A third feature, combinable with any of the previous or following features, the operations further comprising decomposing an interaction into sub-interactions for which the traffic is filtered based on business groups.

A fourth feature, combinable with any of the previous or following features, wherein providing output includes providing a dashboard that provides, for each interaction, a visual representation of performance of the interaction, wherein the visual representation includes a current performance and a history of past performance.

A fifth feature, combinable with any of the previous or following features, the operations further comprising determining that a service is degraded if one or more interaction response times exceed a threshold.

In a third implementation, a computer-implemented system, comprising: one or more processors; and a non-transitory computer-readable storage medium coupled to the one or more processors and storing programming instructions for execution by the one or more processors, the programming instructions instruct the one or more processors to perform operations comprising: generating a layout of an end-to-end IT service, the layout identifying components of the end-to-end IT service and including a physical layout and a logical layout; dividing the layout into smaller blocks, each smaller block representing a function or a set of functions; identifying interactions for aggregation points between two or more blocks; measuring, using probes placed at aggregation points in the end-to-end IT service, performance of each interaction at each aggregation point, wherein placement of the probes is optimized based on the interactions; and providing output that includes information indicating measured performance of the interactions, including prioritized information for measured performance of anomalies.

The foregoing and other described implementations can each, optionally, include one or more of the following features:

A first feature, combinable with any of the following features, wherein the measured performance includes a response time.

A second feature, combinable with any of the previous or following features, wherein measuring performance of each interaction includes using a probe placed at the aggregation point of the interaction, the probe configured to collect performance information.

A third feature, combinable with any of the previous or following features, the operations further comprising decomposing an interaction into sub-interactions for which the traffic is filtered based on business groups.

A fourth feature, combinable with any of the previous or following features, wherein providing output includes providing a dashboard that provides, for each interaction, a visual representation of performance of the interaction, wherein the visual representation includes a current performance and a history of past performance.

A fifth feature, combinable with any of the previous or following features, the operations further comprising determining that a service is degraded if one or more interaction response times exceed a threshold.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), compact disc read-only memory (CD-ROM), DVD+/−R, DVD-RAM, DVD-ROM, high definition digital video disc (HD-DVD), and BLURAY, and similar optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in this invention can be any file system type accessible from multiple servers for read and update. Locking or consistency tracking is not necessary in this invention since the locking of exchange file system can be done at application layer. Furthermore, Unicode data files are different from non-Unicode data files.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    generating a layout representative of an end-to-end information technology (IT) service, the generating based on physical components of the end-to-end IT service, the layout identifying and representing all interactions among components of the end-to-end IT service, the layout identifying all components of the end-to-end IT service and including a physical layout and a logical layout, the generating including:
        identifying the interactions by accessing application programming interfaces (APIs), remote function calls (RPCs), and universal resource locators (URLs) used by the components of the end-to-end IT service;
        dividing the layout into smaller blocks, each smaller block representing a function or a set of functions, wherein dividing the layout into the smaller blocks includes sub-dividing block-to-block interactions into the smaller blocks based on business groups; and
        identifying interactions for aggregation points between two or more smaller blocks;
    measuring, using probes placed at aggregation points in the end-to-end IT service, performance of each interaction at each aggregation point, wherein placement of the probes is optimized based on the interactions; and
    providing output that identifies all of the components and interactions within the end-to-end IT service and includes information indicating measured performance of the interactions, including prioritized information for measured performance of anomalies.

2. The computer-implemented method of claim 1, wherein the measured performance includes a response time.

3. The computer-implemented method of claim 1, wherein measuring performance of each interaction includes using a probe placed at the aggregation point of the interaction, the probe configured to collect performance information.

4. The computer-implemented method of claim 1, further comprising decomposing an interaction into sub-interactions for which the traffic is filtered based on business groups.

5. The computer-implemented method of claim 1, wherein providing output includes providing a dashboard that provides, for each interaction, a visual representation of performance of the interaction, wherein the visual representation includes a current performance and a history of past performance.

6. The computer-implemented method of claim 1, further comprising determining that a service is degraded if one or more interaction response times exceed a threshold.

7. The computer-implemented method of claim 6, wherein the threshold is fixed or the threshold is dynamic based on a baseline using historical performance data.

8. The computer-implemented method of claim 1, further comprising updating operating parameters of a device in the end-to-end IT service based on the information indicating measured performance of the interactions.

9. A non-transitory, computer-readable medium storing one or more instructions executable by a computer system to perform operations comprising:
    generating a layout representative of an end-to-end information technology (IT) service, the generating based on physical components of the end-to-end IT service, the layout identifying and representing all interactions among components of the end-to-end IT service, the layout identifying all components of the end-to-end IT service and including a physical layout and a logical layout, the generating including:
        identifying the interactions by accessing application programming interfaces (APIs), remote function calls (RPCs), and universal resource locators (URLs) used by the components of the end-to-end IT service;
        dividing the layout into smaller blocks, each smaller block representing a function or a set of functions, wherein dividing the layout into the smaller blocks includes sub-dividing block-to-block interactions into the smaller blocks based on business groups; and
        identifying interactions for aggregation points between two or more smaller blocks;
    measuring, using probes placed at aggregation points in the end-to-end IT service, performance of each interaction at each aggregation point, wherein placement of the probes is optimized based on the interactions; and providing output that identifies all of the components and interactions within the end-to-end IT service and includes information indicating measured performance of the interactions, including prioritized information for measured performance of anomalies.

10. The non-transitory, computer-readable medium of claim 9, wherein the measured performance includes a response time.

11. The non-transitory, computer-readable medium of claim 9, wherein measuring performance of each interaction includes using a probe placed at the aggregation point of the interaction, the probe configured to collect performance information.

12. The non-transitory, computer-readable medium of claim 9, the operations further comprising decomposing an interaction into sub-interactions for which the traffic is filtered based on business groups.

13. The non-transitory, computer-readable medium of claim 9, wherein providing output includes providing a dashboard that provides, for each interaction, a visual representation of performance of the interaction, wherein the visual representation includes a current performance and a history of past performance.

14. The non-transitory, computer-readable medium of claim 9, the operations further comprising determining that a service is degraded if one or more interaction response times exceed a threshold.

15. A computer-implemented system, comprising:
one or more processors; and
a non-transitory computer-readable storage medium coupled to the one or more processors and storing programming instructions for execution by the one or more processors, the programming instructions instruct the one or more processors to perform operations comprising:
generating a layout representative of an end-to-end information technology (IT) service, the generating based on physical components of the end-to-end IT service, the layout identifying and representing all interactions among components of the end-to-end IT service, the layout identifying all components of the end-to-end IT service and including a physical layout and a logical layout, the generating including:
identifying the interactions by accessing application programming interfaces (APIs), remote function calls (RPCs), and universal resource locators (URLs) used by the components of the end-to-end IT service;
dividing the layout into smaller blocks, each smaller block representing a function or a set of functions, wherein dividing the layout into the smaller blocks includes sub-dividing block-to-block interactions into the smaller blocks based on business groups; and
identifying interactions for aggregation points between two or more smaller blocks;
measuring, using probes placed at aggregation points in the end-to-end IT service, performance of each interaction at each aggregation point, wherein placement of the probes is optimized based on the interactions; and
providing output that identifies all of the components and interactions within the end-to-end IT service and includes information indicating measured performance of the interactions, including prioritized information for measured performance of anomalies.

16. The computer-implemented system of claim 15, wherein the measured performance includes a response time.

17. The computer-implemented system of claim 15, wherein measuring performance of each interaction includes using a probe placed at the aggregation point of the interaction, the probe configured to collect performance information.

18. The computer-implemented system of claim 15, the operations further comprising decomposing an interaction into sub-interactions for which the traffic is filtered based on business groups.

19. The computer-implemented system of claim 15, wherein providing output includes providing a dashboard that provides, for each interaction, a visual representation of performance of the interaction, wherein the visual representation includes a current performance and a history of past performance.

20. The computer-implemented system of claim 15, the operations further comprising determining that a service is degraded if one or more interaction response times exceed a threshold.

* * * * *